United States Patent [19]

Uemura

[11] 3,821,806

[45] June 28, 1974

[54] CASSETTE TAPE APPARATUS

[75] Inventor: Yasuhiro Uemura, Tokyo, Japan

[73] Assignee: Teac Corporation, Tokyo, Japan

[22] Filed: June 19, 1972

[21] Appl. No.: 264,180

[30] Foreign Application Priority Data

June 20, 1971 Japan ................................ 46-44079
June 20, 1971 Japan ................................ 46-44080
June 20, 1971 Japan ................................ 46-44081

[52] U.S. Cl. ................................................ 274/4 F
[51] Int. Cl. ............................................ G11b 5/00
[58] Field of Search ...................................... 274/4 F

[56] References Cited

UNITED STATES PATENTS 3,484,055 12/1969 Raine ................................ 274/4 F
3,511,508 5/1970 Ban .................................... 274/4 F
3,620,385 11/1971 Vermeislen ......................... 274/4 F

*Primary Examiner*—Harry N. Haroian
*Attorney, Agent, or Firm*—Marshall & Yeasting

[57] ABSTRACT

A cassette tape apparatus which employs a cassette having a magnetic tape wound on reels housed in a casing and is designed to record signals on the tape or reproduce them therefrom based upon a cassette tape deck with the cassette held on a cassette holder, and in which the cassette holder is adapted to turn through a predetermined rotational angle on the chassis and hold a plurality of cassettes with their major faces being held vertical at intervals of the afore-mentioned rotational angle and the cassette tape deck is constructed to move on a straight line toward and away from the major face of one of the cassettes within an area surrounded by the cassettes held on the cassette holder; in which the cassette holder is adapted to hold the cassette with its major face being vertical, the cassette tape deck is adapted to move toward and away from the major face of the cassette and has a horizontal plate having a cassette guide window formed in alignment with a cassette guide window of the cassette holder, an actuating member is slidably disposed on the cassette guide window of the horizontal plate in such a manner as to assume a position to permit the cassette to be guided to the cassette holder and a position not to permit it to be guided and the actuating member has associated therewith a switch for electrically controlling the cassette tape deck; and in which the cassette holder has left and right guide members for guiding the cassette with its first major face being held vertical, a first sliding member having a horizontal plate for receiving a second major face of the cassette guided by the left and right guide members, slidable in a vertical direction and biased by a first spring and a second sliding member slidable in a horizontal direction and biased by a second spring for retaining the cassette guided by the left and right guide members and received by the first sliding member, thereby holding the cassette. The cassette tape deck is designed to move toward and away from the major face of the cassette held by the cassette holder and has means for releasing the cassette from its condition held by the cassette holder.

4 Claims, 4 Drawing Figures

CASSETTE TAPE APPARATUS

BACKGROUND OF THE INVENTION

1. Field of the Invention

This invention relates to a cassett tape apparatus which employs a cassette such that a magnetic tape wound on reels having central apertures is housed in a casing having a first major face or faces having formed therein at least capstan receiving apertures and reel drive shaft receiving apertures and a second major face having formed therein at least a magnetic head receiving window and perpendicular to the first major face or faces and by which signals are recorded on the tape or reproduced therefrom.

2. Description of the Prior Art

Cassette tape apparatus of this kind have a cassette holder for loading a cassette thereon and a cassette tape deck and are designed so that the deck is moved toward the cassette relative thereto and the tape in the cassette is driven by the deck.

However, conventional cassette tape apparatus are bulky and complicated in construction and they have a construction which permits a faulty operation such that while the deck is in engagement with the cassette holder the cassette is inserted in the cassette holder or taken out therefrom. Further, it is relatively troublesome in the prior cassette tape apparatus to load or take up the cassette in or from the cassette holder.

SUMMARY OF THE INVENTION

Accordingly, one object of this invention is to provide a cassette tape apparatus which is small and simple in construction. According to one example of this invention, the overall size of the apparatus is defined only by the cassette holder, and hence is extremely small.

Another object of this invention is to provide a cassette tape apparatus which is adapted to allow loading or taking out of the cassette in or from the cassette holder only when the deck is held disengaged from the cassette holder. According to another example of this invention, a plate having a guide window corresponding to a cassette guide window of the cassette holder is disposed opposite to the cassette holder, an actuating member is provided which assumes a position to guide the cassette to the guide window of the plate and a position not to guide it and a switch for electrically controlling the cassette tape deck is associated with the actuating member.

Another object of this invention is to provide a cassette tape apparatus in which the cassette can be easily loaded in the cassette holder and taken out therefrom. According to another example of this invention, the cassette holder has left and right guide members for guiding the cassette with its front facing downward, a first sliding member receiving the front of the cassette with a horizontal face and sliding down in a vertical direction against a spring when the cassette is guided by the left and right guide members and a second sliding member which is adapted so that when the cassette is guided by the left and right guide members it engages the front of the cassette to be slid in a horizontal direction against a spring to permit the cassette to be guided and that it engages the back of the cassette when the cassette slides down the first sliding member in a vertical direction and is guided by the left and right guide members, and the cassette is held between the horizontal face of the first sliding member and the second sliding member and when the second sliding member is caused to slide in the horizontal direction against the spring the cassette is automatically pushed up by the force of a spring associated with the second sliding member.

Other objects, features and advantages of this invention will become apparent from the following description taken in conjunction with the accompanying drawings.

DESCRIPTION OF THE PREFERRED EMBODIMENTS

Figure 1:
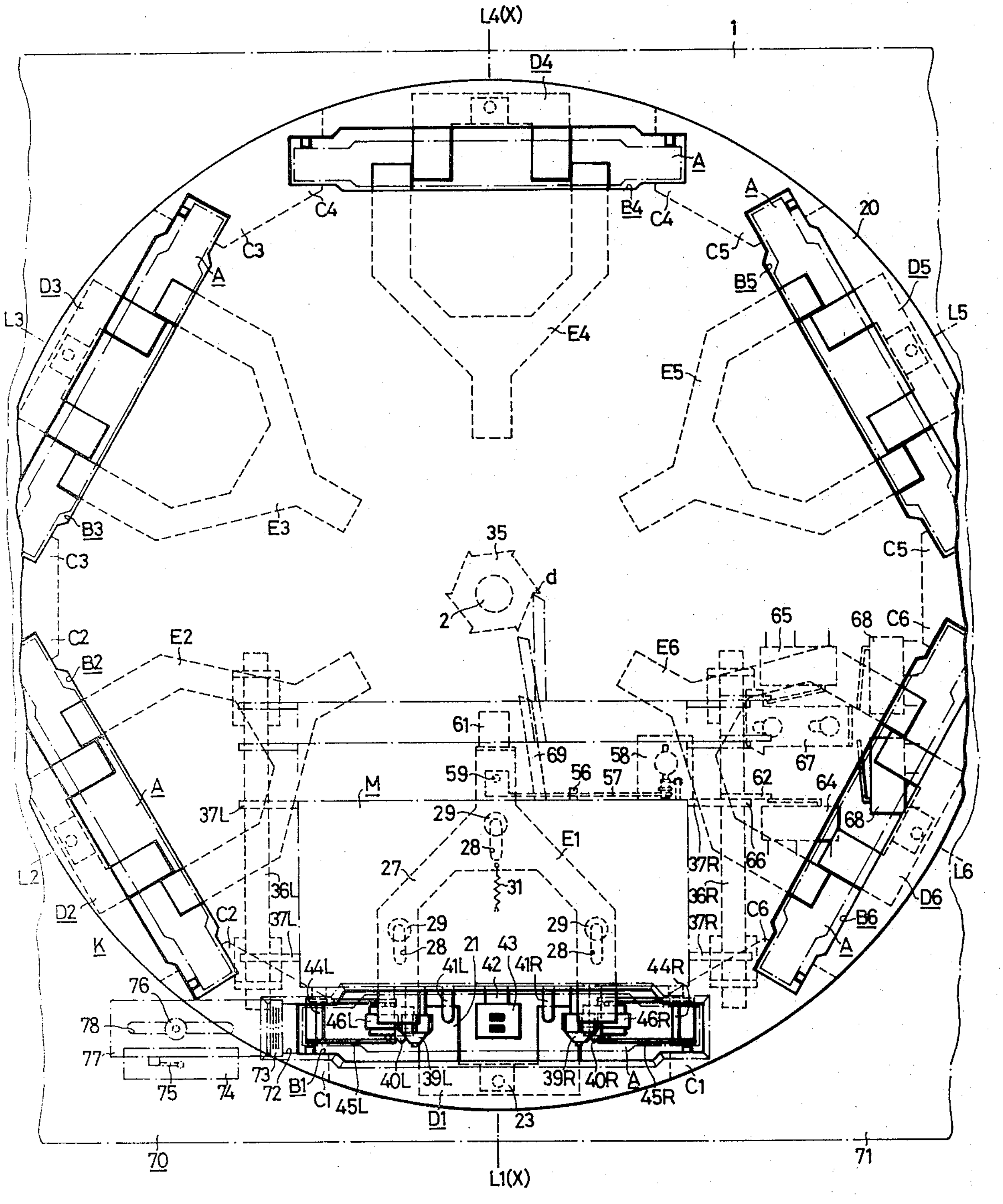
FIG. 1 is a plan view schematically illustrating one example of cassette tape apparatus produced according to this invention.
Figure 2:
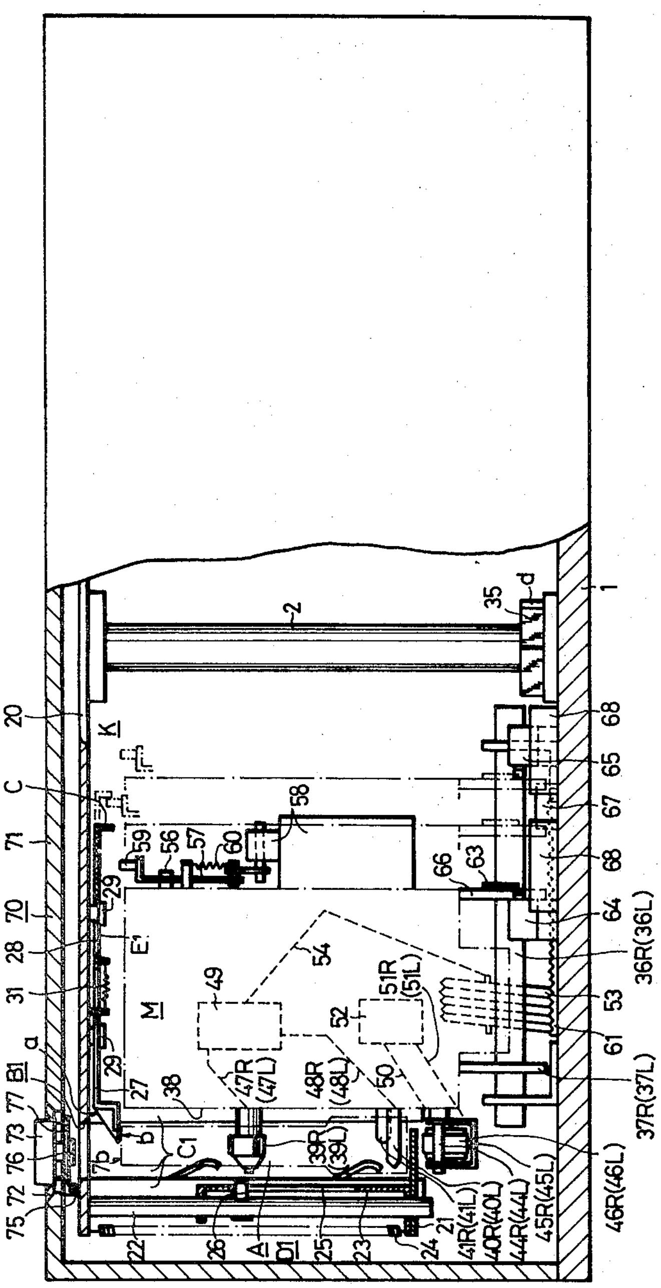
FIG. 2 is a fragmentary right side view, partly in section, of the cassette tape apparatus exemplified in FIG. 1.
Figure 3A:
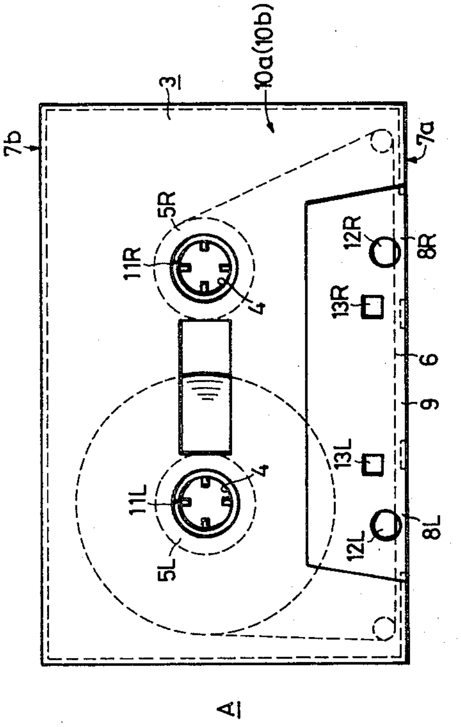
FIGS. 3A and 3B are plan and front views of a cassette usable in this invention respectively.
Figure 3B:
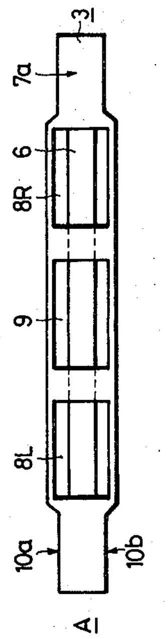

With reference to the drawings a detailed description will be given of one example in this invention. Reference numeral 1 indicates generally a horizontal chassis, to which a shaft 2 is pivotally journalled, and the shaft 2 has carried a cassette holder K at its upper end. The cassette holder K is designed to hold a plurality of, for example, six cassettes A. Each of the cassettes A is as shown in FIG. 3 which is of the construction of the so-called philips cassette and in which reels 5L and 5R having centrally disposed apertures 4 respectively are disposed in a casing 3; a magnetic tape 6 is stretched between the reels 5L and 5R across a left pinch roller receiving window 8L, a magnetic head receiving window 9 and a right pinch roller receiving window 8R formed in the front 7*a* of the casing 3 and sequentially arranged in that order from left to right; left and right apertures 11L and 11R are formed in top and bottom members 10*a* and 10*b* of the casing 3 in alignment with the central apertures 4 of the left and right reels 5L and 5R respectively; left and right capstan receiving holes 12L and 12R are formed in the top and bottom members 10a and 10b of the casing 3 at the forward portion thereof at places corresponding to the pinch roller receiving windows 8L and 8R respectively; and holes 13L and 13R for receiving left and right guide pins are formed in the top and bottom members 10a and 10b of the casing 3 at the forward portion thereof at corresponding places between the pinch roller receiving windows 8L and 8R and the magnetic head receiving window 9 respectively.

The cassette holder K has a horizontal disc 20 attached to the upper end of the shaft 2. The horizontal disc 20 has cassette receiving windows B1 to B6 which are formed to extend perpendicular to six imaginary lines L1 to L6 extending from the center of the disc 20 in its radial direction outwardly thereof at equiangular intervals and pairs of frame-like guide members C1 to C6 which are attached to the underside of the disc 20 to extend downwardly therefrom in such a manner that when the cassette A is inserted into each of the windows B1 to B6 from above, the left and right sides of the cassette A are guided down with its top and bottom members 10*a* and 10*b* being held substantially perpendicular to the plane of the chassis 1. Further, the horizontal disc 20 has sliding members D1 to D6 which are slidable in a vertical direction and each of which has a horizontal receiving plate 21 for receiving that portions of the front wall 7*a* of the cassette A in which the windows 8L, 8R and 9 do not exist when the cassette A has been guided by each pair of guide members down to its lowermost position, and sliding members E1 to E6 which are slidable in the extending directions of the lines L1 to L6, that is, perpendicular to the top and bottom members 10*a* and 10*b* of the cassettes A which are vertically guided down by the guide members C1 to C6 and received by the horizontal receiving plates 21 of the sliding members D1 to D6 respectively. In this case, the receiving plate 21 of each of the sliding members D1 to D6 is secured to the underside of a ⊐ shaped bracket 23 slidably mounted on a shaft 22 extending downwardly from the underside of the disc 20, while a spring 24 is stretched between the receiving plate 21 and the disc 20. Further, the bracket 23 has an elongated aperture 25 formed centrally thereof extending in a vertical direction, in which is loosely inserted a pin 26 attached to the shaft 22 and extending perpendicular thereto, so that each of the sliding members D1 to D6 and consequently each horizontal receiving plate 21 is biased upwardly. Each of the sliding members E1 to E6 is formed of a plate 27 and has elongated apertures 28 extending in the same direction as each of the lines L1 to L6, into which guide pins 29 planted on the underside of the disc 20 are loosely fitted. While, a spring 31 is stretched between each plate 27 and the disc 20, so that each of the sliding members E1 to E6 is biased outwardly in the direction of each of the lines L1 to L6. In this case, the outer free ends of the plate 27 have downwardly inclined faces *a* and horizontal faces *b* extending inwardly from the free ends thereof and the inner free end of the plate 27 has an engaging piece c downwardly extending therefrom. Each of the sliding plate 27 is adapted so that when it is in its normal outermost biased position the inclined faces *a* and the horizontal faces *b* lie in the cassette path defined by each of the pairs of guide members C1 to C6 and when it is slid inwardly against the spring 31 the faces *a* and *c* lie out of the cassette path.

Accordingly, when the cassette A is inserted into each of the windows B1 to B6 from above and guided down by each of the pairs of guide members C1 to C6, the front 7*a* of the cassette A is pushed into engagement with the inclined faces *a* of each of the sliding members E1 to E6, so that each sliding member E is slid inwardly to open the path for the cassette A and, further pushing down the cassette A, the horizontal receiving plate 21 of each sliding member D is slid by the front 7*a* downwardly against the spring 24. Thus, when the back 7*b* of the cassette A opposing the front 7*a* *thereof has been brought to be flush with the horizontal faces b* of each of the sliding member E1 to E6, each of the sliding member E1 to E6 is slid outwardly by the biasing force of the spring 31. Accordingly, removing the pressure for guiding down the cassette A against the spring 24, the cassette A is held with its back 7*b* abutting with the horizontal faces *b* of each of the sliding members E1 to E6. Thus, the cassettes A are loaded on the cassette holder K.

The shaft 2 carrying the cassette holder K is affixed thereto a ratchet wheel 35 having six clicks *d*. The ratchet wheel 35 and consequently the shaft 2 is adapted to be turned through the angle between adjacent clicks *d* by an engaging piece 69 attached to a cassette tape deck M at every reciprocation thereof as will be described later on. In this case, however, fixed rotational angular positions of the ratchet wheel 35 on the shaft 2 are predetermined so that the lines L1 to L6 representative of the angular positions, at which the cassettes A are mounted on the disc 20, may sequentially lie on a reference line X—X passing through the shaft 2 on the chassis 1.

Further, the cassette tape deck M is mounted on the horizontal chassis 1 in a manner to be slidable along the reference line X—X relative to the cassette holder K. In this case, the tape deck M is slidably provided in an area surrounded by the cassettes A mounted on the cassette holder K, particularly between the cassette A on the reference line X—X and the shaft 2. To this end, rails 36L and 36R, which extend in parallel with the reference line X—X, are disposed on the chassis 1 in opposing relation to the left and right sides of the deck M, while the deck has attached thereto support pieces 37L extending to the left from the left side thereof and having loosely inserted therein the rail 36L and support pieces 37R extending to the right from the right side thereof and having loosely inserted therein the rail 36R.

The deck M has left and right reel drive shafts 39L and 39R, left and right capstans 40L and 40R and left and right guide pins 41L and 41R which project forwardly from an imaginary vertical plane 38 on the front of the deck M in a perpendicular relation thereto. In this case, the relative arrangements of the shafts 39L and 39R, the capstans 40L and 40R and the pins 41L and 41R are the same as those of the apertures 11L and 11R, 12L and 12R and 13L and 13R of the cassette A described above, and their positions relative to the chassis 1 are aligned with the apertures 11L and 11R, 12L and 12R and 13L and 13R of the cassette A mounted on the cassette holder K at the forward position on the line X—X. Further, the deck M has a magnetic head 43 disposed on a slidable member 42 with its tape contact surface facing upward, the slidable member 42 being adapted to move up and down along the aforementioned imaginary vertical plane 38, and left and right pinch rollers 46L and 46R mounted on left and right rotary arms 45L and 45R affixed to left and right pins 44L and 44R extending perpendicular to the imaginary vertical plane 38. In this case, the positions of the magnetic head 43 and the pinch rollers 46L and 46R relative to the chassis 1 are such that they are aligned with the windows 9, 8L and 8R of the cassette A which is held on the cassette holder K at the forward portion on the line X—X, as above described. The reel drive shafts 39L and 39R are driven by rotational drive means, generally indicated by 49, mounted on the deck M through rotational coupling means 47L and 47R respectively. The capstans 40L and 40R are driven by the rotational drive means through coupling means 48L and 48R respectively and, further, the slidable member 42 and consequently the magnetic head 43 is moved up along the imaginary vertical plane 38 by actuating means 52 through coupling means 50. Further, the rotary arms 45L and 45R of the pinch rollers 46L and 46R are rotated by the actuating means 52 through coupling means 51L and 51R respectively.

In addition, the deck M has a worm wheel 53 which partly projects down from its underside and which is adapted to be driven by the rotational drive means 49, while a rack 61 is mounted on the chassis 1 along the line X—X with which the worm wheel 53 meshes. Accordingly, when the worm wheel 53 is driven, for example, clockwise, the deck M moves back and when the worm wheel 53 is driven anticlockwise, the deck moves forward. Further, the deck M is provided on its back with a arm 57 pivoted to a pin 56, the one end of the rotary arm 57 being coupled to a plunger 58 attached to the back of the deck M and the other end having attached thereto an upwardly extending engaging piece 59. While, when the arm 57 is biased by a spring 60 to rotate and the engaging piece 59 is caused to project upwardly by energization of the plunger 58 and the deck M moves back, the engaging piece 59 engages with that C of one of the aforementioned sliding member E1 to E6 lying on the line X—X, so that this sliding member is moved back against the spring 31. On the right side of the deck M there is provided an engaging piece 62 which projects to the right and is attached to, for example, the support piece 37R, while micro-switches 64 and 65 are mounted on the chassis 1. The micro-switch 64 for engagement with the engaging piece 62 is designed to define a maximum forward position of the deck M and to provide a switch signal representing that the deck M has arrived at its maximum forward position. The switch 65 for engagement with the engaging piece 62 is similarly adapted to define a maximum backward position of the deck M and to provide a switch signal representing that the deck M has reached its maximum backward position. Further, there is provided on the right side of the deck M an engaging piece 66 which similarly projects to the right and may be formed with the lower end portion of the support piece 37R, while switches 68 are provided on the chassis 1 which are actuated by a sliding plate 67 which is provided on the chassis 1 in a manner to be slidable to the right and left. While the deck M lies in a predetermined section between its maximum forward and backward positions the engaging member 66 engages the sliding plate 67 to slide it into engagement with the switch 68, thereby deriving therefrom a switch signal representing that the deck M lies in its intermediate section. Further, the back of the deck M has attached thereto an engaging piece 69 extending rearwardly thereof in a swingable manner. In this case, the length of the engaging piece 69 is selected such that when the deck M has moved from its maximum forward position back to such a position where the switch signal is derived from the switch 68 through the engaging piece 66 and the sliding plate 67, the engaging piece 69 assumes a position to get in engagement with the ratchet wheel 35 and that while the deck M further moves back to its maximum backward position, the engaging piece 69 engages with one click *d* of the rachet wheel 35 to turn the ratchet wheel 35 and consequently the shaft 2 through the rotational angle between adjacent clicks *d*.

Reference numeral 70 designates a case housing therein the aforementioned cassette holder K, which has a horizontal top plate 71 in which a window 72 for guiding the cassette A with its top and bottom members 10*a* and 10*b* being held substantially vertical is formed at a position corresponding to the forward portion on the reference line X—X. When the cassette holder K lies at such a rotational position that each of the lines L1 to L6 lies on the reference line X—X, the cassette A is loaded and held on the cassette holder K through the window 72 and that one of the windows B1 to B6 of the horizontal plate 20 which lies on the reference line X—X, as previously described. In this case, there is disposed, for example, on the left of the cassette guide window 72 an actuating member 73 which is slidably guided in a lateral direction and can be operated on the upper side of the plate 71 and the actuating member 73 is coupled with a sliding plate 77 which is disposed to be slidable in a lateral direction on the underside of the plate 71. While, a switch 74 is fixedly mounted on the chassis 1 and the free end of its movable member 75 is connected to the sliding plate 77. When the actuating member 73 is in its leftward sliding position, the cassette A is guided through the window 72 but when the actuating member 73 is in its rightward sliding position, the cassette A is prevented from being guided through the window 72. Further, the switch 74 is adapted to provide switch signals representing that the actuating member 73 is in its left and right sliding positions. Reference numeral 78 indicates an elongated guide hole formed in the sliding plate 77 and 76 a guide pin loosely inserted therein.

The foregoing has outlined the construction of one example of this invention. The following will describe its operation. Let it be assumed that the cassette A has been guided by each of the pairs of guide members C1 to C6 down to its lowermost position with its front 7*a* resting on the horizontal plate 21 of each of the sliding members D1 to D6 and with its back 7b abutting with the horizontal faces *b* of each of the sliding members E1 to E6, that is, the cassettes A are loaded on the cassette holder K. Further, assume that the cassette tape deck M lies at the intermediate position between its maximum forward and backward positions and that the actuating member 73 lies at such a position where the cassette A is not guided through the window 72. Energizing an electrical control circuit (not shown) for the rotational drive means 49 and the actuating means 52 of the deck M, the rotational drive means 49 starts to drive the worm wheel 53 clockwise and, by its cooperation with the rack 61, the deck M is guided back on the guide rails 36L and 36R and the rachet wheel 35 and consequently the shaft 2 is rotated by the engaging piece 69. When the shaft 2 has just been rotated through about 60°, the engaging piece 62 moves into engagement with the switch 65 to derive a switch signal therefrom, so that an electrical control circuit is constituted including the switch 65 to reverse the rotation of the worm wheel 53 to move the deck M forward. Assuming that the line L1 lies on the reference line X—X and the cassette A guided by the guide members C1 lies at the forward position, the reel drive shafts 39L and 39R, the capstans 40L and 40R and the guide pins 41L and 41R of the deck M are inserted into the reel drive shaft receiving apertures 11L and 11R, the capstan receiving apertures 12L and 12R and the guide pin receiving apertures 13L and 13R of the cassette A respectively. At this time, the engaging piece 62 is in engagement with the switch 64 to derive a switch signal therefrom, so that an electrical control circuit is constituted including the switch 64 to stop the rotation of the worm wheel 53. Further, the actuating means 52 is driven to urge the magnetic head 43 against the tape through the window 9 of the cassette A and, for example, the right-hand pinch roller 46R is brought into rotary contact with the capstan 40R with the tape 6 being gripped therebetween, by which the tape 6 is transported from the reel 5L to that 5R while making contact with the magnetic head 43 to reproduce signals previously recorded on the tape 6. Assuming that rotating frictional coupling means is incorporated in each of the rotational coupling means 47L and 47R for the reel drive shafts 39L and 39R and that the tape 6 is retained at both ends to the reels 5L and 5R respectively, when the tape 6 on the reel 5L has entirely been taken up on the reel 5R, the reel drive shafts 39L and 39R stop rotation and this is detected by rotation detecting means (not shown) associated with, for example, the reel drive shaft 39L. Based upon this detected output, the electrical control circuit is controlled and by the actuating means 52, the magnetic head 43 is lowered and the pinch roller 46R is disengaged from the capstan 40R. Further, by the rotational drive means 49, the worm wheel 53 is driven clockwise to bring back the deck M and the engaging piece 69 again engages with the ratchet wheel 35 in the same manner as that previously described to rotate the shaft 2 through about 60° again to derive a switch signal from the switch 65 again. Based upon the signal thus obtained, the deck M moves forward and then signals recorded on the tape in the cassette A located at the forward position are similarly reproduced. Subsequently, such operations are sequentially repeated.

The aforementioned operations are achieved by the fact that the actuating member 73 lies at such a position where the cassette is not guided through the window 72 on the assumption that the electrical control circuit is formed including the switch 74 associated with the actuating member 73. However, if the deck M is in its forward position for reproducing the signal recorded on the tape in the cassette A and if the actuating member 73 lies at such a position where the cassette is guided through the window 72, the electrical control circuit is controlled by a switch signal derived from the switch 74, by which the magnetic head 43 is moved back and the pinch roller 46R is disengaged from the capstan 40R as above described. Further, the plunger 58 is energized to rotate the arm 57 to bring up the engaging piece 59, after which the worm wheel 53 rotates clockwise to move back the deck M and the engaging piece 59 engages that C of the sliding member E (E1 to E6) and they move back together with the deck M. When the horizontal faces *b* have got out of contact with the back 7*b* of the cassette A, one portion of the cassette A is popped out onto the horizontal plate 71 through the windows B(B1 to B6) and 72 by the biasing force of the spring 24 of the horizontal receiving plate 21. Also after the cassette A has been partly popped up, the deck M continues to move back and when the engaging piece 66 gets into engagement with the sliding plate 67 to actuate the switch 68, an electrical control circuit is formed including the switch 68 and, based upon a switch signal derived from the switch 68, the worm wheel 53 stops its rotation, and hence the deck M stops. Further, the plunger 58 is deenergized to disengage the engaging piece 59 from that C of the sliding member E (E1 to E6), so that the sliding member E(E1 to E6) becomes free and moves toward its initial position. When the cassette A having partly popped out is removed, the sliding member E(E1 to E6) completely returns to its initial position. Further, when another cassette is replaced for the cassette A and is inserted through the windows 72 and B (B1 to B6) while being guided by the guide members C (C1 to C6) and then the actuating member 73 is slid into such a position where the cassette is not guided through the window 72, the electrical control circuit is controlled based upon a switch signal derived from the switch 74. Thus, the deck M moves back and the shaft 2 rotates and then the deck M moves forward to reproduce signals recorded on the tape in the cassette and, upon completion of reproduction, the deck M moves back in the manner above described. Subsequently, the same operations are repeated.

While the deck M moves back from its forward position where the engaging member 62 actuates the switch 64 to the position where the engaging piece 66 engages the sliding plate 67 to actuate the switch 68 and while the deck M moves forward from the position where the engaging piece 66 is disengaged from the sliding plate 67 to the position where the engaging piece 62 actuates the switch 64, even if the actuating member 73 is brought to the position to permit the cassette A to be guided through the window 72, the deck stops its movement and the cassette is popped up in the same manner as above described. However, even if the actuating member 73 is brought to the position to permit the cassette to be guided through the window 72 while the deck M moves forward from the position where the engaging piece 66 engages the sliding plate 67 to actuate the switch 68 to the position where the engaging piece 66 disengages from the sliding plate 67, the plunger 58 is not energized, so that the operation above described is not achieved and when the deck assumes the position where the engaging piece 66 is disengaged from the sliding plate 67 the plunger 58 is energized to achieve the operation above described.

According to the example of this invention above described, signals recorded on the tapes of a plurality of cassettes can be automatically and continuously reproduced in a sequential order. Further, since the deck M is formed movable relative to the cassette holder in the area surrounded by the cassettes held on the cassette holder K. the overall size of the apparatus depends only upon the size of the cassette holder and can be reduced. Further, when the actuating member 73 lies at the position to permit the cassette A to be guided through the window 72, the deck M lies midway between its forward and backward positions and the capstans 40L and 40R, the reel drive shafts 39L and 39R and so on the deck M do not exist in the path in which the cassette A is guided to be held by the cassette holder K. Accordingly, there is no possibilities of the cassette A being damaged and the reel driving shafts 39L and 39R being bent when the cassette A is guided to be held on the cassette holder K. Further, when the actuating member 73 lies at the position not to permit the cassette A to be guided through the window 72, the deck M is in its forward position to reproduce the signal recorded on the tape on the deck M is moving but, in such a case, the cassette A cannot be loaded on the cassette holder K and this ensures to eliminate the possibilities of the cassette A being accidentally damaged and the capstans and the reel drive shafts being bent accidentally. In addition, the cassette can be positively loaded on the cassette holder at a predetermined position only by guiding it onto the cassette holder but, only by operating the actuating member 73 when desired, the cassette is automatically popped out in a manner to be easily taken out, so that a desired cassette can be loaded on the cassette holder at will.

It will be apparent that many modifications and variations may be effected without departing from the scope of the novel concepts of this invention.

I claim as my invention:

1. A cassette tape apparatus comprising:

A. a cassete holder arranged to turn through a predetermined angle and holding thereon a plurality of cassettes at intervals of the angle, each cassette having a magnetic tape wound on reels having central apertures respectively in a casing, the casing having a first major face having formed therein at least capstan receiving apertures and reel drive shaft receiving apertures and a second major face having formed therein at least a magnetic head receiving window and perpendicular to the first major face and each cassette being held by the cassette holder with its first major face being substantially vertical, and B. a cassette tape deck having at least a capstan and a reel drive shaft arranged to extend perpendicular to an imaginary vertical plane, a magnetic head arranged to project from the imaginary vertical plane with its tape contact surface facing said head receiving window, rotational driving means for driving the capstan and the reel drive shaft and actuating means for actuating thee magnetic head along the imaginary vertical plane, C. in which the cassette tape deck is arranged to move on a straight line toward the first major face of one of the cassettes held at a predetermined rotational position of the cassette holder for inserting the capstan and reel drive shaft into the capstan receiving aperture and the reel drive shaft receiving aperture of the cassette respectively within an area surrounded by the plurality of cassettes held on the cassette holder, and D. in which the magnetic head is arranged to make contact with the magnetic tape of the cassette by energization of the actuating means after the cassette tape deck has moved toward the cassette holder.

2. A cassette tape apparatus comprising:

A. a cassette holder for holding thereon at least one cassette, the cassette having a magnetic tape wound on reels having central apertures respectively in a casing, the casing having a first major face having formed therein at least capstan receiving apertures and reel drive shaft receiving apertures and a second major face having formed therein at least a magnetic head receiving window and perpendicular to the first major face and the cassette being held by the cassette holder with its first major face being substantially vertical, B. a cassette tape deck having at least a capstan and a reel drive shaft arranged to extend perpendicular to an imaginary vertical plane, a magnetic head arranged to project from the imaginary vertical plane with its tape contact surface facing said head receiving window, rotational driving means for driving the capstan and the reel drive shaft and actuating means for actuating the magnetic head along the imaginary vertical plane, C. means for moving the tape cassette deck toward the cassette held on the cassette holder for inserting the capstan and the reel drive shaft into the capstan receiving aperture and the reel drive shaft receiving aperture of the cassette respectively, and D. a horizontal plate having a cassette guide window and disposed on the side where the cassette is loaded in or taken out from the cassette holder, E. an actuating member for selectively guiding and preventing the cassette to be loaded in or taken out from the cassette holder, the actuating member being disposed to be slidable to cover one portion of the cassette guide window of the horizontal plate, and F. electrical switching means associated with the actuating member for controlling an electrical control circuit for the cassette tape deck.

3. A cassette tape apparatus comprising:

A. a cassette holder for holding thereon at least one cassette, the cassette having a magnetic tape wound on reels having central apertures respectively in a casing, the casing having a first major face having formed therein at least capstan receiving apertures and reel drive shaft receiving apertures and a second major face having formed therein at least a magnetic head receiving window and perpendicular to the first major face and the cassette being held by the cassette holder with its first major face being substantially vertical, B. a cassette tape deck having at least a capstan and a reel drive shaft arranged to extend perpendicular to an imaginary vertical plane, a magnetic head arranged to project from the imaginary vertical plane with its tape contact surface facing said head receiving window, rotational driving means for driving the capstan and the reel drive shaft and actuating means for actuating the magnetic head along the imaginary vertical plane, and C. means for moving the tape cassette deck toward the cassette held on the cassette holder for inserting the capstan and the reel drive shaft into the capstan receiving aperture and the reel drive shaft receiving aperture of the cassette respectively, D. in which the cassette holder has left and right guide members for guiding left and right sides of the cassette with its first major face being held substantially vertical, a first sliding member slidable in a vertical direction and having a horizontal receiving plate for receiving the second major face of the cassette guided in a vertical direction by the left and right guide members and a second sliding member slidable in a horizontal direction, the first sliding member being biased by a first spring in a first direction reverse to a second direction in which the cassette is guided to be received by the horizontal receiving plate, and the second sliding member having an inclined face for engagement with the second major face of the cassette and a horizontal face for engagement with a major face opposite to the second major face of the cassette and being biased by a second spring toward the path of the cassette guided in the second direction, and E. in which the cassette tape deck further includes means for sliding the second sliding member in a direction opposite from the path of the cassette guided in the second direction.

4. A cassette tape apparatus according to claim 3 which further includes a horizonal plate having a cassette guide window and disposed on the side where the cassette is loaded in or taken out from the cassette holder, an actuating member for selectively guiding and preventing the cassette to be loaded in or taken out from the cassette holder, the actuating member being disposed to be slidable to cover one portion of the cassette guide window of the horizontal plate, and electrical switching means associated with the actuating member for controlling an electrical control circuit for the cassette tape deck, and in which the means for sliding the second sliding member is actuated based upon a switching signal derived from the electrical switching means.

* * * * *